(12) United States Patent
Benjey

(10) Patent No.: US 6,371,152 B1
(45) Date of Patent: Apr. 16, 2002

(54) METHOD OF CONTROLLING VAPOR VENTING IN A FUEL TANK AND VALVE THEREFOR

(75) Inventor: Robert P. Benjey, Dexter, MI (US)

(73) Assignee: Eaton Corporation, Cleveland, OH (US)

(*) Notice: Subject to any disclaimer, the term of this patent is extended or adjusted under 35 U.S.C. 154(b) by 0 days.

(21) Appl. No.: 09/501,029

(22) Filed: Feb. 9, 2000

(51) Int. Cl.⁷ .............................................. F16K 24/04
(52) U.S. Cl. .......................................... 137/202; 137/43
(58) Field of Search .............................. 137/43, 202, 2

(56) References Cited

U.S. PATENT DOCUMENTS

| | | | |
|---|---|---|---|
| 3,741,234 A | * | 6/1973 | Siebold ...................... 137/202 |
| 3,973,582 A | * | 8/1976 | Siebold ...................... 137/202 |
| 4,770,201 A | * | 9/1988 | Zakai ......................... 137/202 |
| 5,313,977 A | * | 5/1994 | Bergsma et al. ........ 137/202 X |
| 5,605,175 A | * | 2/1997 | Bergsma et al. .......... 137/202 |

* cited by examiner

*Primary Examiner*—Gerald A. Michalsky
(74) *Attorney, Agent, or Firm*—Roger A. Johnston (57) ABSTRACT

A float type vapor vent valve for a vehicle fuel tank. A relatively thin flexible valve member has one end anchored to the float but permitted relative movement with respect to the float in a direction parallel to that of float movement, with the opposite end of the flexible valve member anchored to the float in spaced arrangement from the one end, but permitted limited movement with respect to the float in a direction normal to that of float movement. The flexible arm is bowed in one version and has a flat configuration in another version.

3 Claims, 10 Drawing Sheets

Fig. 21
PRIOR ART

METHOD OF CONTROLLING VAPOR VENTING IN A FUEL TANK AND VALVE THEREFOR

CROSS-REFERENCE TO RELATED APPLICATIONS

Not Applicable

STATEMENT REGARDING FEDERALLY SPONSORED RESEARCH OR DEVELOPMENT

Not Applicable

MICROFICHE APPENDIX

Not Applicable

BACKGROUND OF THE INVENTION

The present invention relates to float operated valves of the type employed for controlling venting of fuel vapor during filling of a fuel tank on board a motor vehicle and particularly relates to systems of the type wherein the tank vent is connected to discharge to a vapor recovery or storage canister. Typically in present high volume production of motor vehicles, a charcoal-filled canister is connected to a vapor vent in the fuel tank; and, the canister is connected through an electrically operated purge valve to the engine inlet manifold. The electrically operated valve is controlled by an electronic control unit (ECU) which controls flow of fuel vapor from the canister to the engine inlet manifold during engine operation; and, the control valve is closed when the engine is not running.

In the aforesaid type fuel tank vapor vent systems, it is necessary to control the venting of fuel vapor to the canister during filling of the fuel tank when the engine is not running in order to prevent liquid fuel from entering the vent and the charcoal canister. Heretofore, float operated vent valves have been employed to close the fuel tank vapor vent to the canister when the fuel reaches a predetermined level in the tank.

However, problems have been encountered in designing and constructing a float operated valve which will close at the desired liquid fuel level or float position. The float must provide sufficient force to overcome the "Bernoulli" effect as the vent valve reaches the closed position and the velocity of the vapor flowing to the vent increases significantly due to the decreasing area of the passage over the vent valve seat. Thus, the buoyancy of the float in the liquid fuel must be sufficient to provide adequate force to overcome the Bernoulli effect and positively close the vent valve against the vent port seat. However, when the float buoyancy provides sufficient force to positively close the vent valve against the Bernoulli effect on an annular valve seat, corking or sticking of the valve has been experienced; and, upon subsequent dropping of the fuel level in the tank from consumption during engine operation, the float gravitational forces have been found in some instances to be insufficient to reopen the valve.

A known on-board refueling vapor recovery valve which has been utilized to overcome this problem is that shown and described in U.S. Pat. No. 5,605,175 issued to Bergsma, et al. which utilizes a resilient valve member having one end attached to the valve body or housing with the opposite end attached to the float for providing a peel-away action to thereby overcome any "corking" or sticking of the valve member as the liquid fuel level in the tank drops below the level which causes the valve to close.

However, the aforesaid fuel vapor vent control valve of Bergsma, et al. has the disadvantage that in high-volume mass production such as required for passenger car and light truck vehicles, it has been found difficult to assemble the valve member to the body and the float and install the float in the valve housing and complete the valve assembly. This arrangement has thus proven to be not only difficult and time consuming but has resulted in a costly construction given the competitive nature of the automotive marketplace.

Figure 21:
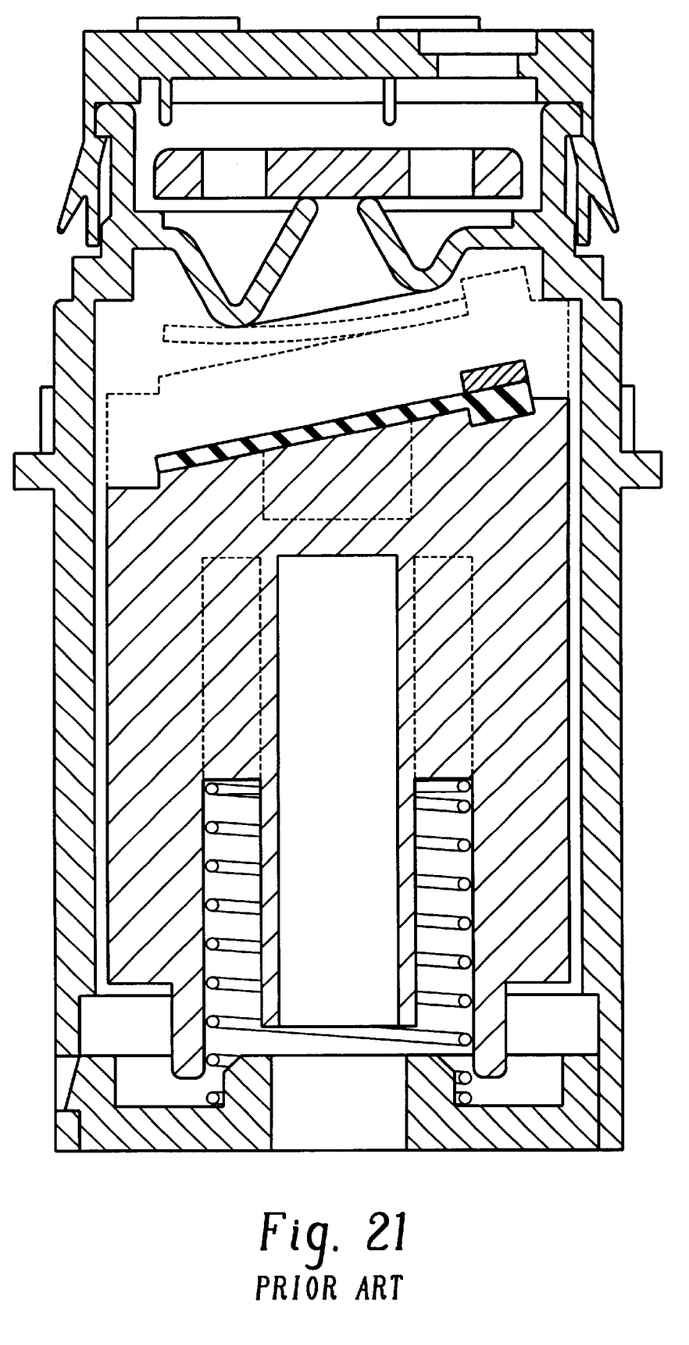

Another prior art float type fuel tank vapor vent valve is shown in FIG. 21, where a flexible valve member has one end anchored to the float and the other end free. This arrangement has proven to be generally unsatisfactory in service.

Thus, it has been desired to provide an improved fuel tank vapor vent control valve which is simple and easy to assemble in mass production yet provides a relatively low manufacturing cost.

BRIEF SUMMARY OF THE INVENTION

The present invention provides a float operated fuel vapor vent control valve for a motor vehicle fuel tank installation which may be of the type either attached to the upper wall of the fuel tank through an aperture in the tank wall; or, may be mounted within the tank as for example through the fuel level sender mechanism aperture and connected to a vent port through the wall of the fuel tank. The float operated valve employs a resilient valve member formed in a relatively thin flat ribbon-like configuration which may be bowed into a hook-shaped configuration formed in a flat configuration with the opposite ends thereof attached to the float in spaced relationship. One of the ends of the resilient valve member is disposed and constrained for limited movement in a direction perpendicular to the direction of movement of the float and the opposite end constrained, but undergoing limited movement relative to the float in a direction parallel to that of float movement. This limited movement of one end of the valve member permits the valve member to maintain a low stiffness or high degree of flexibility even when drawn toward the vent port seat by the Bernoulli effect as the valve nears the closed position.

The resilient valve member in the float valve assembly of the present invention is formed preferably of elastomeric material and may be either cut from flat sheet stock and curved to a hooked configuration at assembly or may be molded to the hook configuration or cut from an extrusion. The valve member is installed on the float by either snap locking with integrally formed attachments or may be frictionally assembled and retained by deformation of the float material, as for example, by heat staking. The flexibility of the relatively thin elastomeric valve member of the present invention coupled with the limited movement of one end in its attachment to the float in a direction perpendicular to the direction of movement of the float and the lateral movement of the opposite end provides a highly flexible member which can readily seal on the vapor vent port and yet just as readily, peel away therefrom upon lowering of the float as fuel is consumed from the tank.

The present invention thus provides a unique and novel way of controlling fuel vapor flow through a vent in a fuel tank and provides a valve construction therefor which is easy to assemble and relatively low cost for high volume mass production.

DETAILED DESCRIPTION OF THE INVENTION

Figure 1:
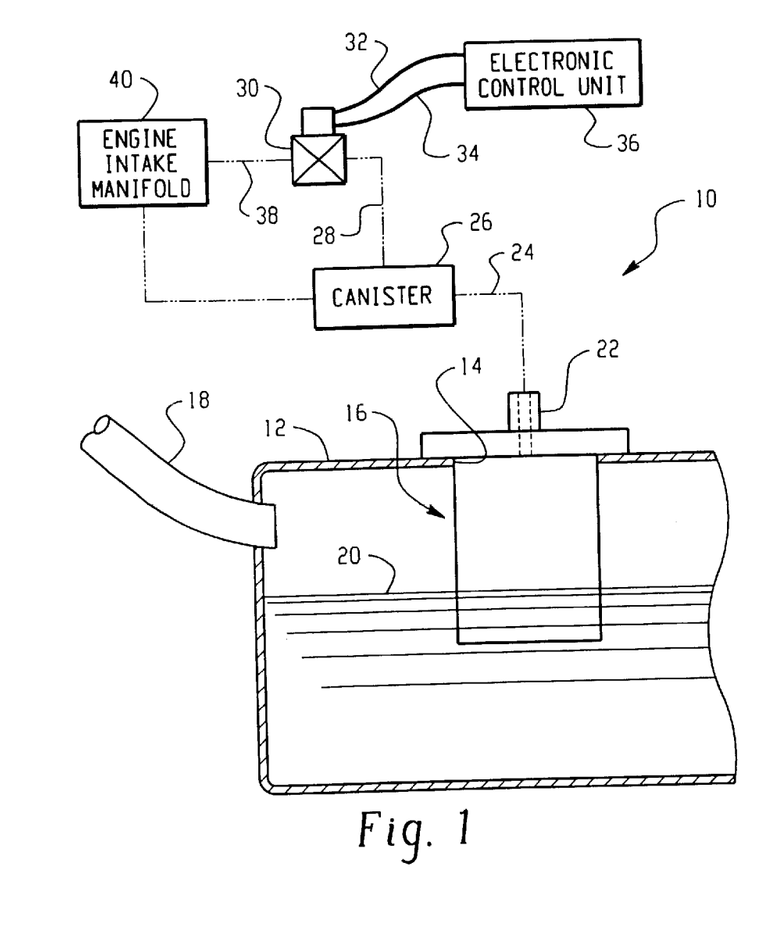
FIG. 1 is a diagrammatic view of a fuel tank vapor vent system utilizing the valve of the present invention with the valve mounted to an aperture in the upper wall of the fuel tank.

Referring to FIG. 1, a fuel vapor vent system for an on-board motor vehicle fuel tank is indicated generally at 10 and includes a tank having an upper wall 12 with an aperture 14 formed therein into which is received a vapor vent valve indicated generally at 16 and which tank has a fuel filler neck 18 received through the wall thereof with the fuel level in the tank indicated by the line 20. Valve 16 has a vent fitting 22 extending exteriorly of the tank wall 12 and is connected by conduit 24, indicated in dashed line, to the inlet of a storage canister 26 which is typically of the type containing granulated carbon particles or charcoal. Canister 26 has a vapor purge line 28 indicated in dashed line in FIG. 1 connected to the inlet of an electrically operated purge valve 30 which has the electrical actuator thereof connected via leads 32, 34 to an electronic control unit 36, typically an engine controller, which also may control the fuel injectors and ignition timing. Valve 30 has its outlet connected through line 38 indicated in dashed outline in FIG. 1 to the engine intake manifold indicated at 40.

Figure 2:
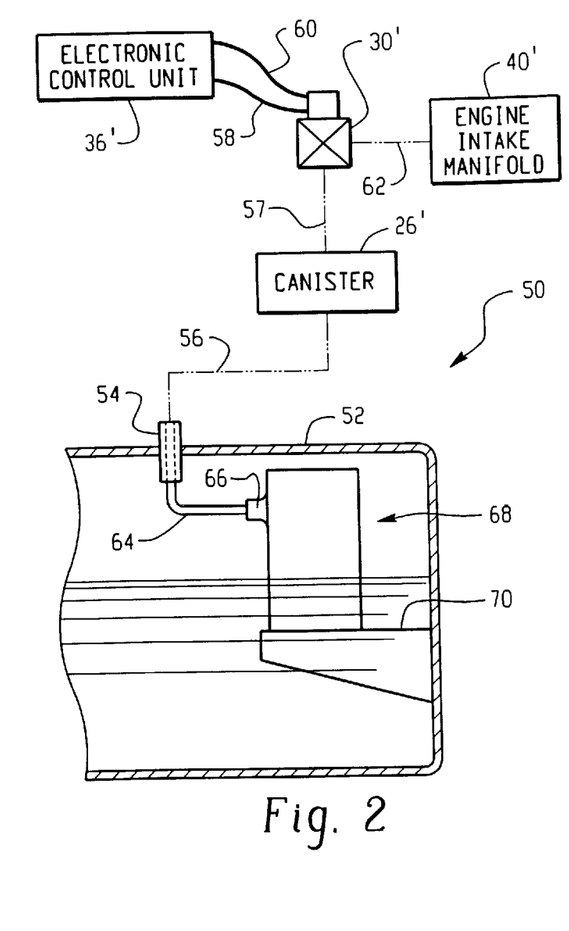
FIG. 2 is an alternative arrangement of the system of FIG. 1 with the vapor vent valve mounted inside the tank and connected remotely to a vent port through the wall in the fuel tank.

Referring to FIG. 2, an alternate arrangement of the system is indicated generally at 50 wherein the upper wall of the fuel tank 52 has a vent port fitting 54 mounted therethrough which is attached at its exterior end via conduit 56 to the inlet of canister 26' which has its outlet connected through electrically actuated valve 30', which is controlled by an ECU 36', via connection through leads 58, 60. Valve 30' has its outlet connected through conduit 62 to the engine intake manifold indicated at 40'.

Tank vent fitting 54 extends through the wall 52 of the tank to the interior thereof and has its interior end connected via conduit 64 to the vent port fitting 66 of a vapor vent control valve indicated generally at 68 which is disposed interiorly of the tank and supported therein by mounting on bracket 70 attached to the inner surface of the tank wall. Although the vent fitting 54 is shown in FIG. 2 as mounted directly through the upper wall 52 of the tank, it will be understood that alternatively fitting 54 may be mounted through the fuel level sender attachment which is typically mounted through an aperture in the upper wall of the tank as is well known in the art.

It will also be understood that vapor vent valve 68, although configured in the embodiment of FIG. 2 for internal tank mounting and conduit connection to fitting 54, is functionally identical to the valve 16 of the embodiment of FIG. 1.

Figure 3:
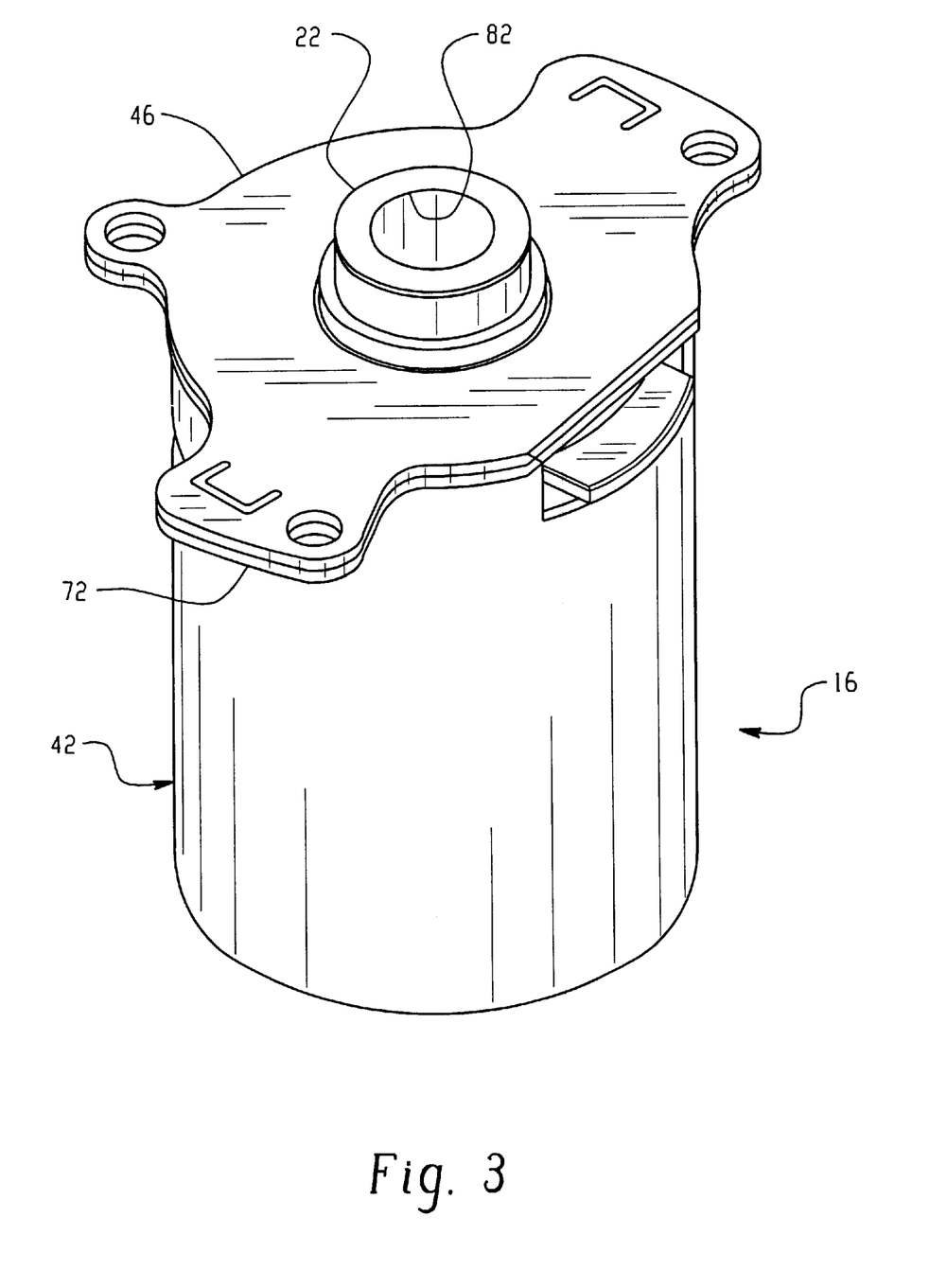
FIG. 3 is an external view of the assembled valve of the present invention.
Figure 4:
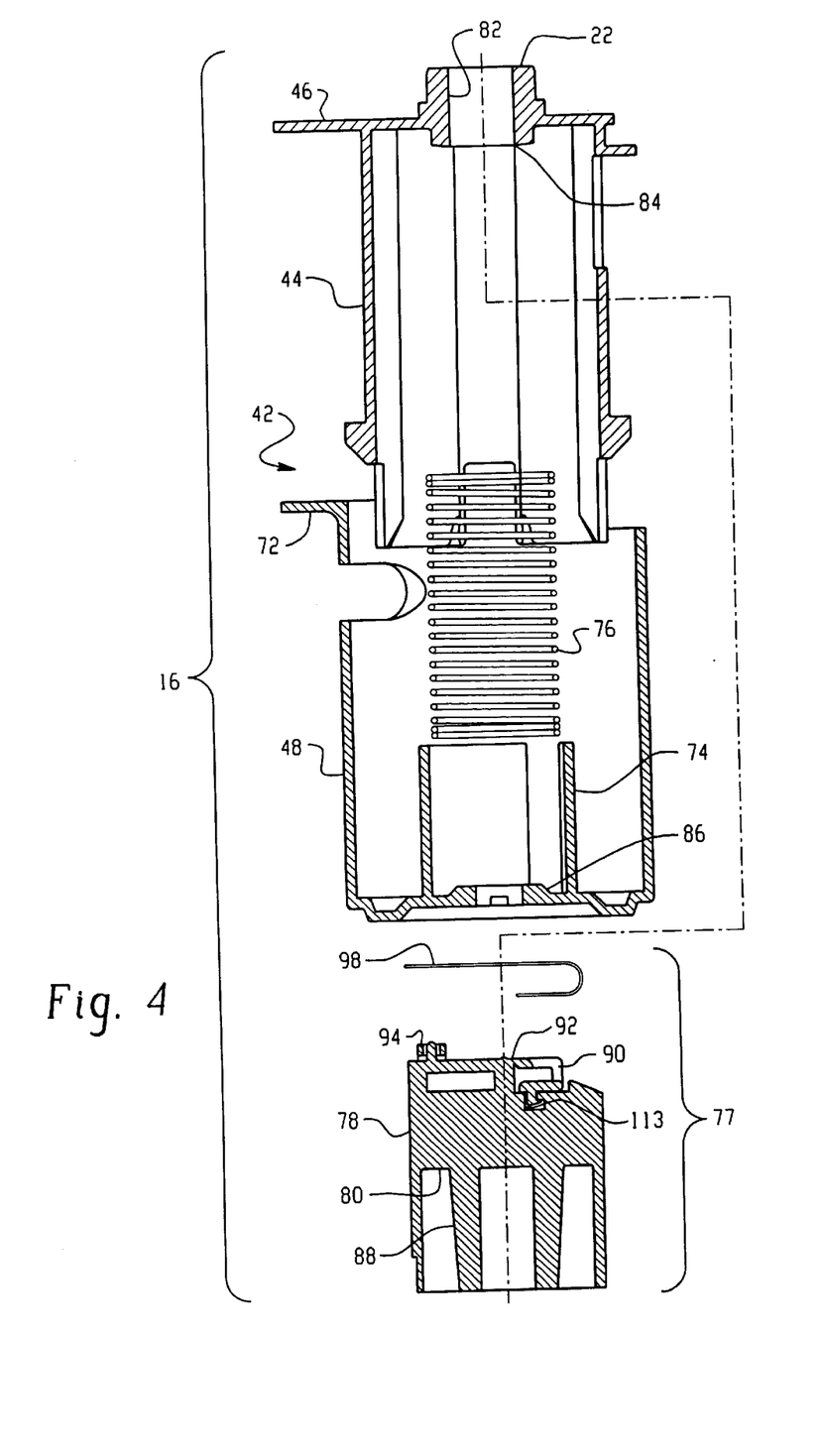
FIG. 4 is an exploded view of the valve of FIG. 3.
Figure 5:
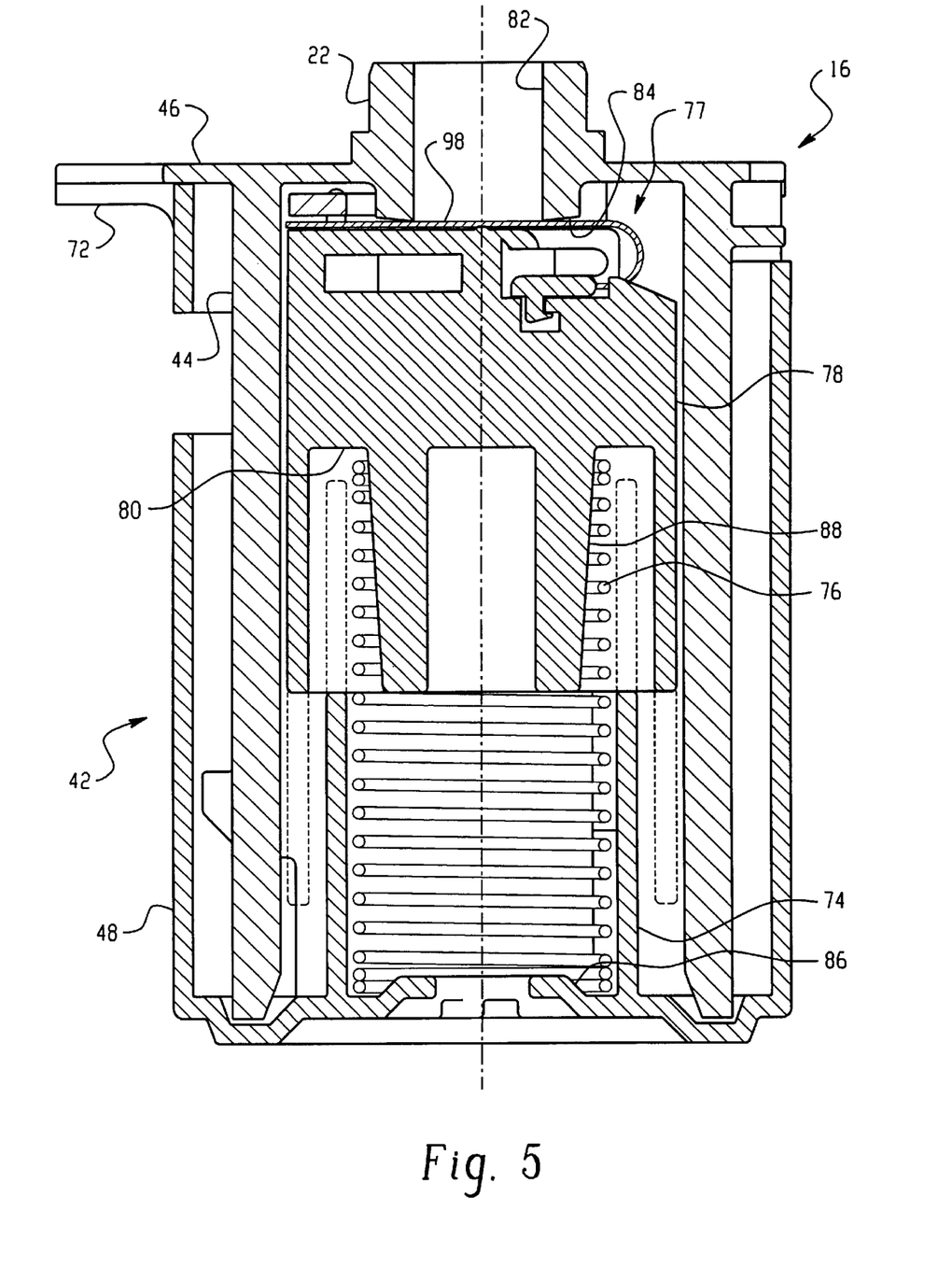
FIG. 5 is a cross-section of an assembled valve made in accordance with the present invention.

Referring to FIGS. 3, 4 and 5, vapor vent valve 16 is illustrated as having a housing indicated generally at 42 which comprises upper housing shell 44 which has mounting flange 46 formed thereon for attachment to the tank and lower housing shell 48 which has a matching flange 72 formed thereon which abuts the undersurface of flange 46 in the assembled valve. Lower housing shell 48 has an inner cylindrical wall 74 formed in the lower end thereof which serves as a guide for float bias spring 76 which has its lower end received in the well formed by cylindrical wall 74 and the lower end of shell.

A float subassembly indicated generally at 77 has a float member 78 having an annular recess or groove 80 formed in the undersurface thereof which has received therein the upper end of bias spring 76 which, as is known in the art is calibrated to provide the proper bias on float 78 to give the desired buoyancy for a given density of float material, in the particular fuel to be used in the tank.

The upper housing flange 46 of housing shell member 44 has the vapor vent port fitting 22 preferably formed integrally therewith; and, vent port fitting 22 has formed therein the vent outlet passage 82 which has an annular valve seat 84 formed about the lower end thereof which extends beyond the undersurface of flanged end of shell 44.

Referring to FIG. 5, the lower end of housing shell 48 has a pilot or guide 86 formed therein which provides centering of the lower end of spring 76. It will be understood that a similar annular guide 88 is formed in the under surface of float member 78 which forms the inner periphery of groove 80 and which also serves to center the upper end of spring 76. As will be seen from FIG. 5, the cylindrical wall 74 of lower housing shell 48 is telescopically received in groove 80 as indicated by dashed outline when the float drops due to consumption of fuel in the tank; and, thus the spring 76 is enclosed and guided to prevent buckling as it is compressed. Spring 76 has a relatively very light spring rate and is easily buckled in compression.

Figure 6:
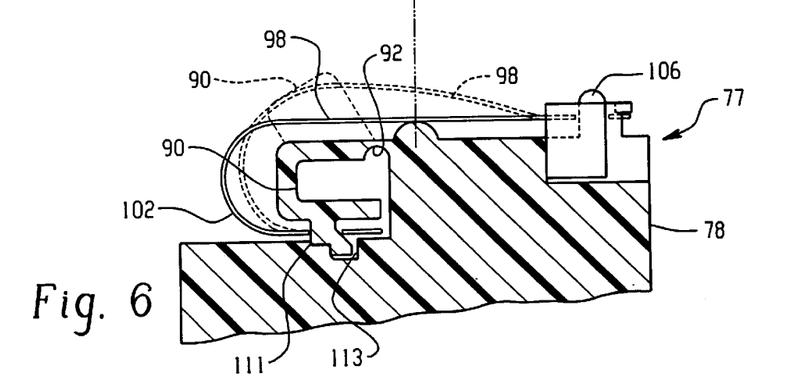
FIG. 6 is a partial cross-section of the upper portion of the float of the valve of FIG. 3 showing an alternate arrangement of the valve member.
Figure 7:
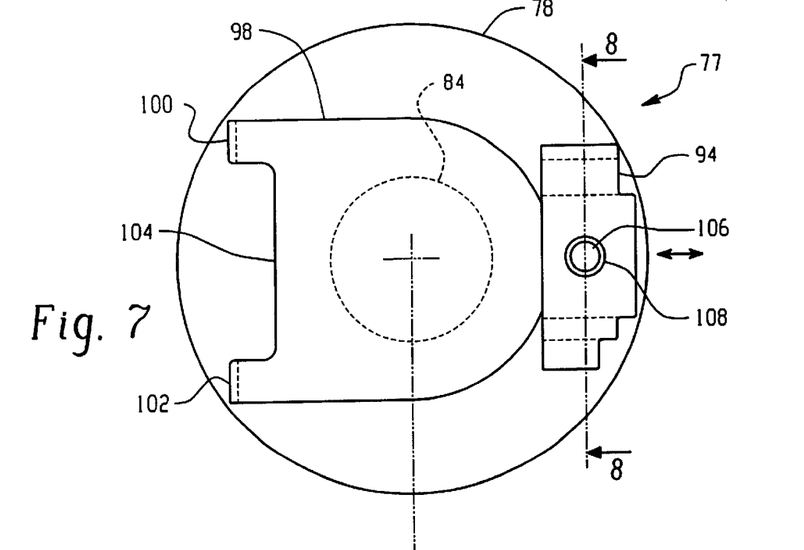
FIG. 7 is a top view of FIG. 6.
Figure 8:
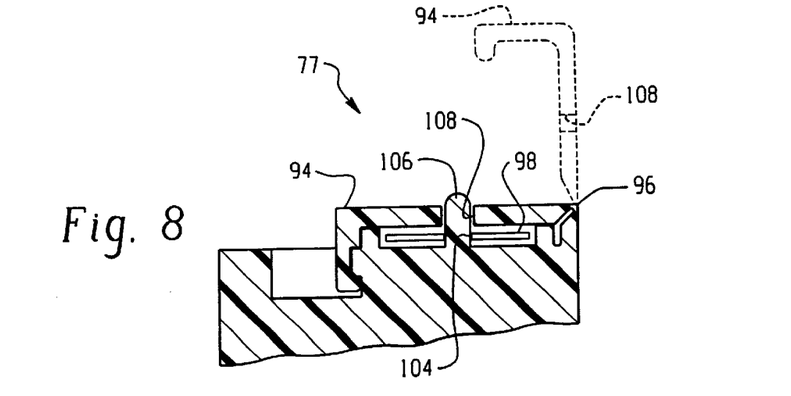
FIG. 8 is a section view taken along section-indicating lines 8—8 of FIG. 7.

Referring to FIGS. 4, 6, 7 and 8, the float assembly 77 is shown in greater detail wherein a valve attachment portion or arm 90 is shown in the assembled state in solid outline and in its as-formed or molded configuration in dashed outline as having an integrally formed hinge 92 of reduced material thickness which is sometimes referred to as a "living" hinge. A second valve attachment portion 94 or arm is shown in the assembled condition in solid outline in FIG. 8 and in the as-formed or molded state in dashed outline. Attachment portion 94 also has an integrally formed hinge portion or living hinge 96 formed thereon as shown in FIG. 8.

A relatively thin flexible valve member formed preferably of elastomeric material has a generally bowed or hook-shaped configuration as shown in FIG. 6 with a cutout or void formed therein to provide flexible leg portions 100, 102 thereon as shown on FIG. 7. The valve member 98 is formed in the configuration shown in FIG. 16 from a flat blank with the void 104 forming the leg portions 100, 102.

With reference to FIG. 7, the area of the valve member 98 which contacts the annular valve seat 84 is shown in dashed outline. It will be understood that the valve member 98 has the configuration shown in solid outline in FIG. 6 when the float is at the upper limit of its travel representing a filled tank with the valve member fully seated against annular valve seat 84 enclosing the vent port 82.

Referring to FIG. 6, the valve member 98 is shown in the bowed configuration in dashed outline and it will be understood that this configuration represents the condition of the valve member 98 when the valve member is deflected by the Bernoulli effect as the valve member approaches the closed condition and begins to restrict flow through the vent. This configuration is achieved by a unique mounting of the valve member on the float as will hereinafter be described.

Figure 16:
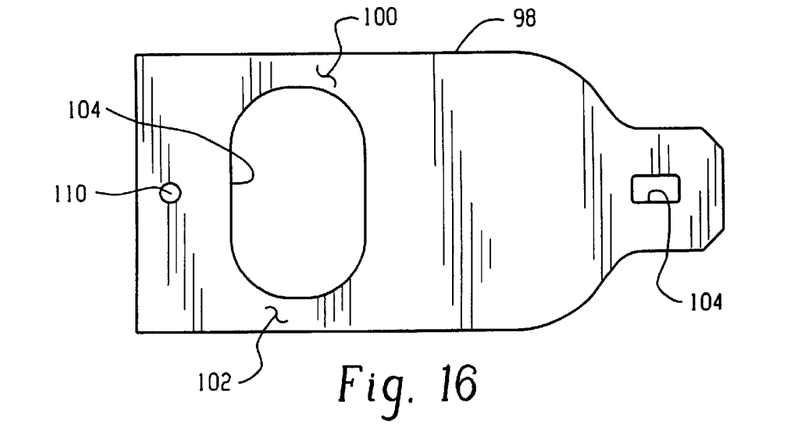
FIG. 16 is a flat pattern blank for the flexible valve member of the embodiment of FIGS. 9 through 11.
Figure 17:
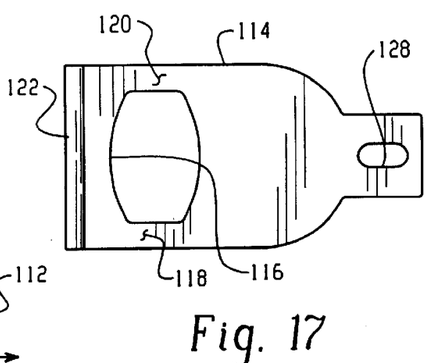
FIG. 17 is a flat pattern blank for the flexible valve member of the embodiment of FIGS. 12 through 14.

Referring to FIG. 16, the end of the valve member 98 distal the reduced width portions 100, 102 has an elongated slot opening or aperture 104 formed therein which is elongated in the longitudinal direction of the valve member 98 and which is received over a projection 106 formed on the upper end of the float and is constrained thereon for limited motion in the horizontal direction or direction normal to that of float movement as indicated by the double ended black arrows in FIG. 7. The end of the valve member 98 having elongated aperture 104 formed therein is retained over the projection 106 by folding and snap-locking the attachment portion 94 thereover with projection 106 extending through an aperture 108 provided in the attachment arm portion 94.

The opposite end of the valve member 98 or, in other words, the end adjacent cutout 104 has a small aperture 110 formed therein which is received over a lug 111 formed on the attachment arm portion 90 and maintains the valve member 98 in the hooked configuration shown in FIG. 6. The attachment arm portion 90 is snap-locked into a groove 113 formed in the upper end of float 78 thereby retaining the end of the valve member in restrained condition. It will be understood that the bowed configuration of the valve member 90 permits limited vertical movement of the end of the valve member having flexible portions 100, 102; and, in contrast thereto the end of the valve member 90 having aperture 104 formed therein is constrained from vertical movement or movement in the direction of the motion of the float, but is permitted limited horizontal movement or movement in a direction transverse to the motion of the float. This unique arrangement of the valve member 90 permits increased flexibility to overcome the Bernoulli effect and to additionally provide a peel-away action of the valve upon lowering of the float or de-corking the valve from valve seat 84.

Figure 12:
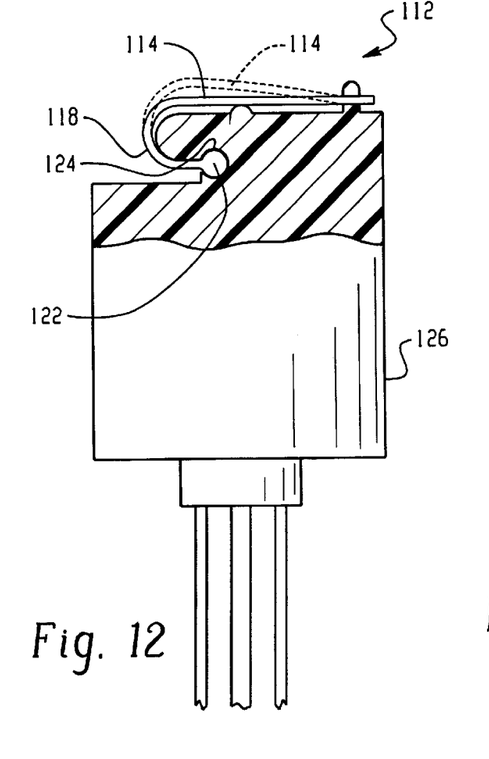
FIG. 12 is a view similar to FIG. 6 of another embodiment of the float and valve assembly.
Figure 13:
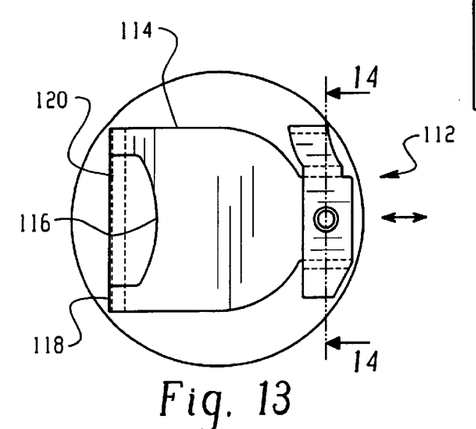
FIG. 13 is a top view of the float assembly of FIG. 12.
Figure 14:
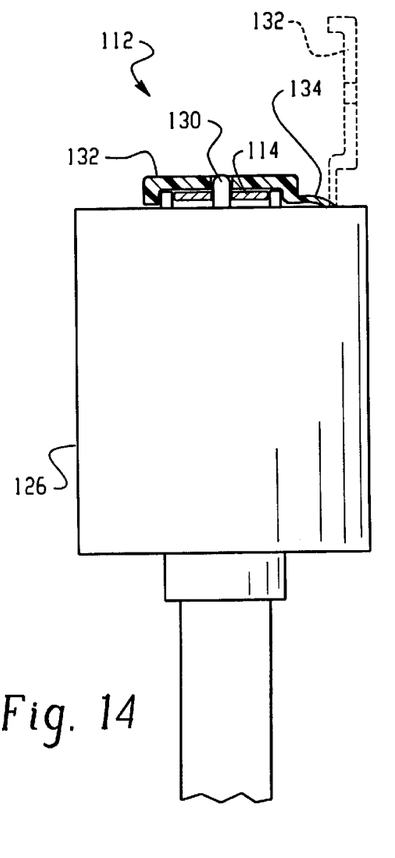
FIG. 14 is a section view taken along section-indicating lines 14—14 of FIG. 13.

Referring to FIGS. 12, 13 and 14, an alternate embodiment of the float subassembly is indicated generally at 112 and as a flexible relatively thin elastomeric valve member 114 formed into a hook-shaped configuration is shown in FIG. 12 with the end thereof adjacent a cutout 116 forming leg portions 118, 120 of increased flexibility. The end adjacent legs 118, 120 has formed integrally thereon a bead portion or rim 122 which is slidably received in a correspondingly configured groove 124 formed in a float 126 in a direction transverse to the direction of movement of the float. It will be understood that the groove 124 and bead portion 122 replace the hinged portion 90 of the float 78 of the FIG. 6 embodiment. The end of valve member 114 opposite bead 122 has an elongated aperture 128 formed therein which is received over a projection 130 formed on the upper end of float 126 and is constrained thereon by an integrally formed attached portion 132 which is attached to the upper surface of float 126 by an integrally formed hinge portion 134 (living hinge). Attachment portion 132 is moved from the position shown in dashed outline in FIG. 14 to the position shown in solid outline to retain the valve member 114 on projection 130. The end of the valve member having aperture 128 formed therein is thus constrained for limited movement in the horizontal direction or in a direction transverse to the motion of the float as indicated by the double ended black arrows in FIG. 13. The opposite or bowed end of the valve member 114 can assume the configuration shown in dashed outline in FIG. 12 when deformed by the Bernoulli effect and deflect therefrom to the flat condition as the valve member closes on the seat. It will be understood that as the valve member moves from the position shown in dashed outline in FIG. 12 under the influence of the Bernoulli effect to the fully closed position shown in solid outline in FIG. 12, that the right end of the valve member having aperture 128 therein undergoes the lateral movement relative to the projection 130 in order to achieve the flat configuration necessary to fully seat on enclosed valve seat 84.

Figures 9, 10, 11:
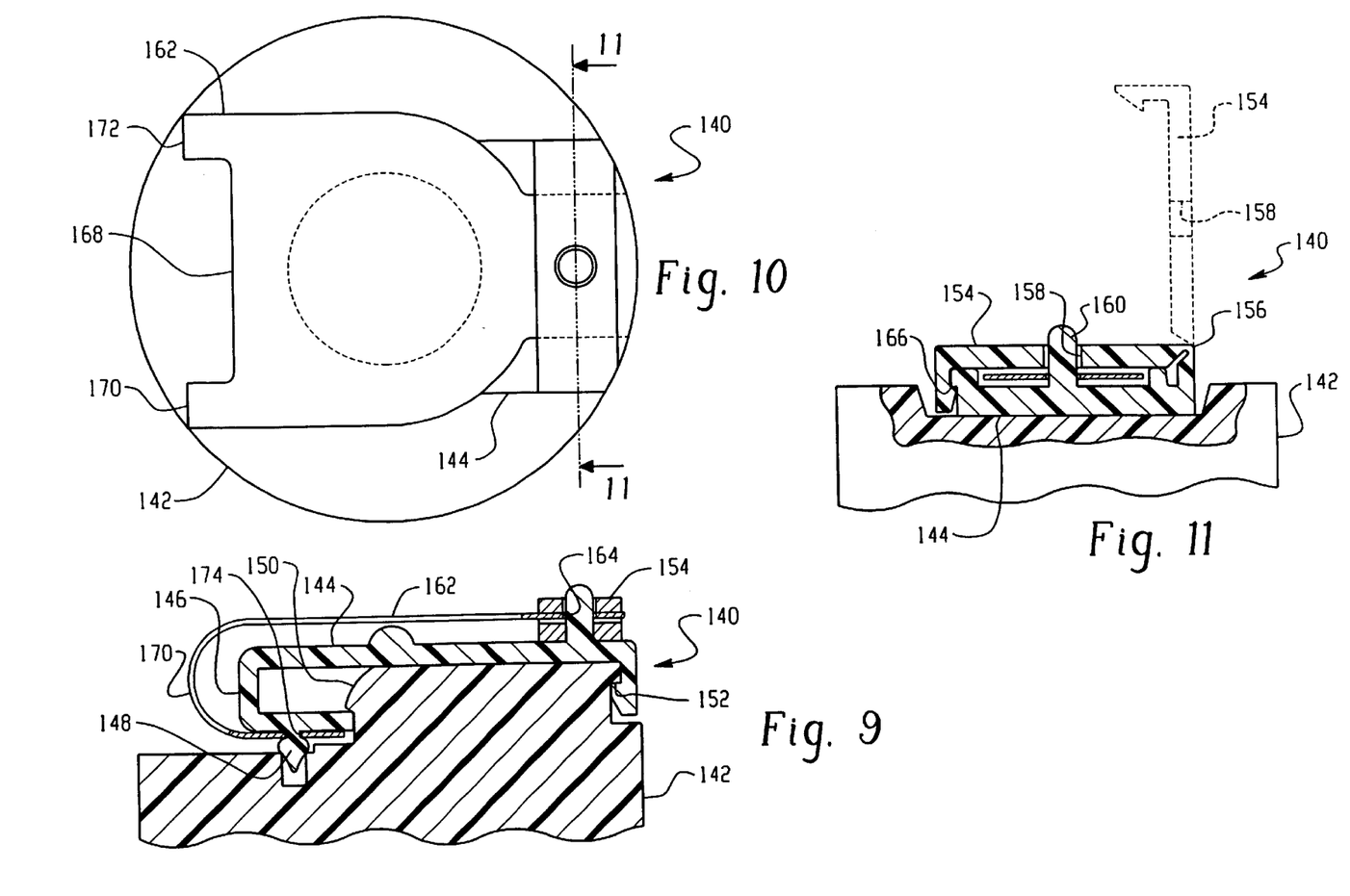
FIG. 9 is a view similar to FIG. 6 of another embodiment of the float and valve for the valve assembly of FIG. 3.
FIG. 10 is a top view of the float and valve assembly of FIG. 9.
FIG. 11 is a section view taken along section-indicating lines 11—11 of FIG. 10.

Referring to FIGS. 9, 10 and 11, another embodiment of the float subassembly is indicated generally at 140 and includes a float member 142 which has a separate valve retaining member 144 attached with one end thereof having a generally U-shaped configuration denoted by reference numeral 146 and which has an attachment projection 148 formed thereon and which is snap-locked over a projection 150 formed on the upper end of float 142 with the opposite end of member 144 snap-locked over a projection 152 provided on the opposite side of float 142. The attachment member has a folding arm portion 154 formed thereon in spaced relationship to projection 148 which arm portion 154 has an integrally formed hinge 156 (living hinge) formed thereon and which has an aperture 158 formed therein which is adapted to be received over a projection 160 formed on the attachment member 144.

A relatively thin flexible valve member 162 has an elongated aperture or slot 164 formed therein adjacent the right hand end thereof, which aperture or slot 164 is received over projection 160 and retained thereon by folding attachment arm portion 154 from the position shown in dashed outline in FIG. 11 to the position shown in solid outline and snap-locking over a lug 166 as shown in FIG. 11.

The opposite end of valve member 162 has a cutout 168 which forms leg portions 170, 172 of increased flexibility to permit the bowed configuration shown in FIG. 9. The end of the valve member 162 distal slot 164 has an aperture 172 formed therein which is received over lug 148, as for example, by stretching and is retained thereon once the U-shaped end 146 of attachment member 144 is snap-locked over lug 150. It will be understood that the valve member 162 functions in the same manner as the valve member 98 of the embodiment 77 of FIG. 6. It will also be understood that the valve member 162 may be formed in a flat pattern similar to that illustrated in FIG. 16.

Figure 15:
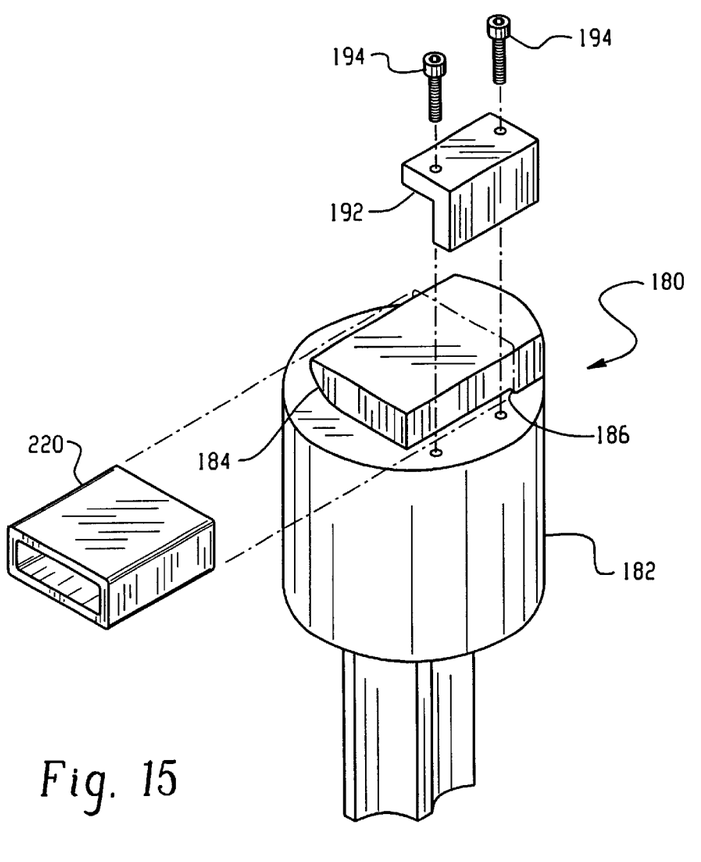
FIG. 15 is an exploded view of another embodiment of the float and valve assembly of the present invention.

Referring to FIG. 15, an alternate embodiment of the float subassembly is indicated generally at 180 and includes a float 182 having a mounting block portion 184 formed on the upper surface thereof which is undercut to form a groove 186 and which has a tapered side to the 188 to the undersurface of the open end of the groove.

The valve member 200 of the embodiment 180 comprises a relatively thin flexible member formed into a generally tubular configuration in cross-section and may be formed from an extrusion and cut therefrom. One end of the valve member 200 denoted by reference numeral 204 is slidably received in the groove 186; and, is positively retained therein by deformation of the material of the float such as, by heat staking the end 184 of the block portion. It will be understood that the tubular valve member is a loose enough fit over block 184 to deform thereon and provide horizontal movement of the valve member 200 in a direction at right angles to the movement of the float. This limited horizontal movement of the end of valve member 200 is instrumental in permitting the valve member to accommodate deformation by the Bernoulli effect and to deform therefrom to the flat position when the valve is fully closed by providing the requisite flexibility to enable the limited buoyant force of the float to close the valve on the valve seat 84. The upper surface of the valve member is restrained against vertical movement on the side remote from taper 188 by attachment of a retaining member 192 having an inverted "L" shape in cross-section and secured by suitable fasteners such as screws 194. The end of the valve member 220 adjacent taper 188 is permitted vertical movement in a direction parallel to that of float movement by virtue of the space formed between taper 188 and the interior of the tubular member 220.

Figure 18:
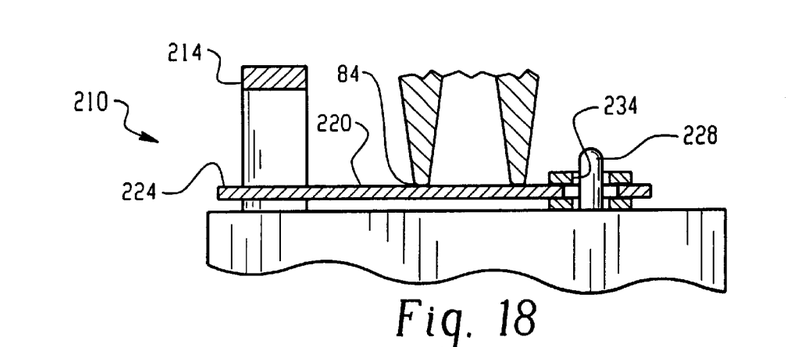
FIG. 18 is a side elevation view with portions broken away of another embodiment of the float subassembly for the valve of the present invention.
Figure 19:
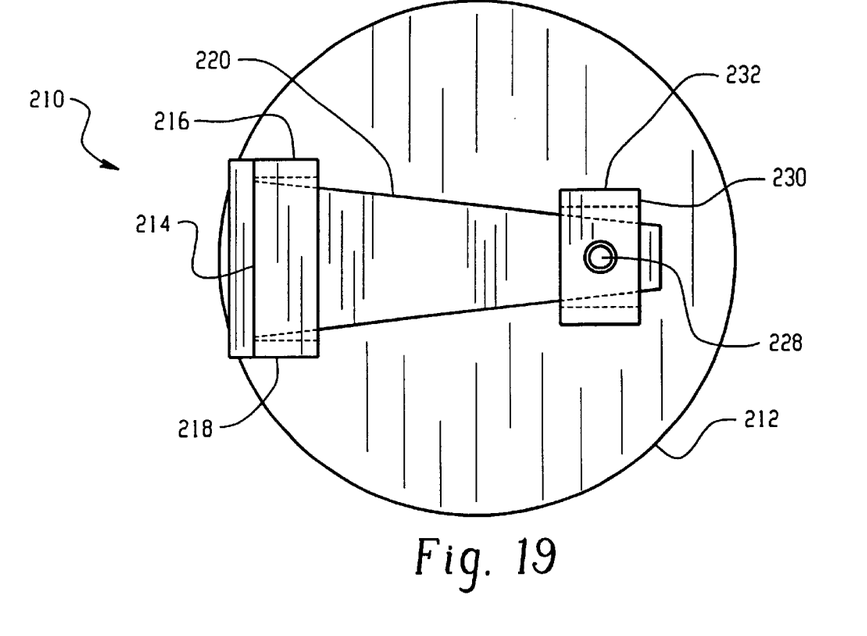
FIG. 19 is a top view of the embodiment of FIG. 18.
Figure 20:
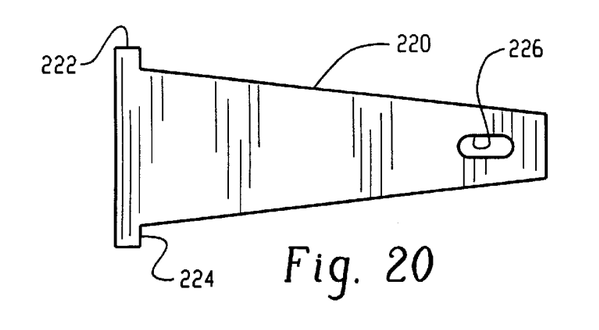
FIG. 20 is a flat pattern view of valve member of the embodiment of FIGS. 18 and 19; and, FIG. 21 is a view of a float subassembly of a prior art fuel vapor vent valve.

Referring to FIGS. 18, 19 and 20, another embodiment of the float subassembly is indicated generally at 210 and has a float 212 with a first mounting portion formed integrally therewith which comprises a foldable arm 214 which is attached to the upper surface of the float by an integrally formed hinge portion (living hinge) 216 and which has the free end thereof denoted by reference numeral 218 snap-locked over a lug provided on the upper surface of the float. The arm 214 is shown in the folded and locked position in FIGS. 18 and 19.

An elongated relatively thin flexible valve member 220 is formed either by molding or cutting from flat sheet stock in a flat pattern form as shown in FIG. 20. The valve member 220 has a pair of oppositely outwardly extending flanges 222, 224 formed at one end thereof; and, has a generally tapered center portion with an elongated slot 226 formed in the end thereof remote from flanges 222, 224. The elongated slot is received over a projection 228 formed on the float assembly. A foldable arm 230 is formed integrally on the float with an integral hinge portion 232 (living hinge) and an aperture 234 formed therein which is received over projection 228 upon folding the arm. It will be understood that arm 230 may be snap-locked over a projecting lug formed on the upper surface of the float 210 in a manner similar to arm 132.

The flanged end of valve member 220 is constrained by the folding and locking of arm 214 in a manner to permit movement relative to the float, in the vertical direction or direction parallel to the float movement. The end of the valve member 220 having slot 226 therein is constrained but is permitted relative movement with respect to the float in a direction horizontally in FIG. 18 or in a direction normal to the float movement. The embodiment of FIGS. 18 and 19 thus provides a flexible flat valve member which may be assembled entirely to the float prior to the installation of the float in the housing and which is capable of accommodating deflection due to the Bernoulli effect as the valve approaches a closed condition against valve seat 84 and to be deformed therefrom to the flat condition as the valve is closed on seat 84. Valve member 220 exhibits a peel-away action upon lowering of the float for de-corking of the valve. The vertical movement of one end of the valve member within its constraint by arm 214 in association with the limited horizontal movement of the opposite end of the valve within the constraint of arm 230 assists in providing a peel-away action. If desired, a small projection 236 may be provided on the upper surface of the float to provide localized contact of the float with the central portion of the valve member to ensure seating on the valve seat 84.

The present invention thus provides a unique and novel fuel vapor vent valve assembly having a thin flexible valve member anchored exclusively on the float with one end secured to provide limited relative movement with respect to the float in a direction corresponding to float movement, with the opposite end constrained but permitted limited relative movement with respect to the float in a direction normal to float movement. The unique constraints of the ends of the flexible valve member thus permit the valve member to flexible deform to accommodate the Bernoulli effect as the valve approaches closed condition and to be deformed therefrom seal effectively on the vent port yet provide ease of opening by a peel-away action as the float is lowered responsive to fuel consumption in the tank.

Although the invention has hereinabove been described with respect to the illustrated embodiments, it will be understood that the invention is capable of modification and variation and is limited only by the following claims.

What is claimed is:

1. A vent valve assembly for controlling fuel vapor vent flow in a fuel tank comprising:
   (a) a housing having a vapor vent passage therethrough adapted for communicating with a vent port in the fuel tank;
   (b) said housing including a float moveable with respect thereto for responding to the liquid fuel level in the tank and a relatively thin flexible valve member associated with said float and operable to close said vapor vent passage when said float rises to a position representative of a certain level of fuel in said tank, and said flexible valve member is operative to reopen said passage in a peel-away action when said float drops below said certain level; and,
   (c) said flexible valve member comprising a bowed strip having a generally hooked portion operative for closing said vapor vent passage, wherein said flexible valve member comprises an elongated strip having a first and second opposite end thereof anchored to said float in spaced relationship with one of said opposite ends disposed for limited movement in the direction of elongation.

2. A vent valve assembly for controlling fuel vapor vent flow in a fuel tank comprising:
   (a) a housing having a vapor vent passage therethrough adapted for communicating with a vent port in the fuel tank;
   (b) said housing including a float moveable with respect thereto for responding to the liquid fuel level in the tank and a relatively thin flexible valve member associated with said float and operable to close said vapor vent passage when said float rises to a position representative of a certain level of fuel in said tank, and said flexible valve member is operative to reopen said passage in a peel-away action when said float drops below said certain level; and, (c) said flexible valve member comprising a bowed strip having a generally hooked portion operative for closing said vapor vent passage, wherein said valve member has opposite ends thereof anchored to said float.

3. A vent valve assembly for controlling fuel vapor vent flow in a fuel tank, comprising:

(a) a housing having a vapor passage therethrough adapted for communicating with a vent port in the fuel tank;

(b) said housing including a float moveable with respect thereto for responding to the liquid fuel level in the tank and a relatively thin flexible valve member associated with said float and operable to close said vent passage when said float rises to a position representative of a certain level of fuel in said tank, and said flexible valve member is operative to reopen said passage in a peel-away action when said float drops below said certain level; and, (c) said flexible valve member has first and second opposite ends thereof anchored to said float with said first end constrained but permitted limited movement relative to said float in the direction of float movement and said second end constrained thereon but permitted limited movement relative to said float in a direction generally normal to the direction of float movement.

* * * * *